United States Patent
Ball

[15] 3,659,443
[45] May 2, 1972

[54] STEERING COLUMN LOCK INHIBITOR

[72] Inventor: Jeremy T. Ball, Birmingham, Mich.

[73] Assignee: Chrysler Corporation, Highland Park, Mich.

[22] Filed: Sept. 30, 1970

[21] Appl. No.: 76,916

[52] U.S. Cl. ............................................................70/186
[51] Int. Cl. .........................................................B60r 25/02
[58] Field of Search..................70/184, 185, 186, 210, 211, 70/252

[56] References Cited

UNITED STATES PATENTS

| | | |
|---|---|---|
| 1,360,674 | 11/1920 | Olbon........................................70/185 |
| 3,572,067 | 3/1971 | Kimberlin et al. ........................70/252 |
| 1,867,831 | 7/1932 | Hershey....................................70/252 |
| 1,211,835 | 1/1917 | Foote........................................70/185 |
| 2,203,949 | 6/1940 | Edwards....................................70/252 |

Primary Examiner—Albert G. Craig, Jr.
Attorney—Talburtt and Baldwin

[57] ABSTRACT

Steering shaft lock inhibitor including a rotatable generally bowl-shaped member having a blocking section on the inside thereof. The blocking section prevents movement of a steering shaft locking lever assembly into a locking position. The blocking section can be manually rotated out of the path of the lever assembly to permit locking of the steering shaft.

8 Claims, 6 Drawing Figures

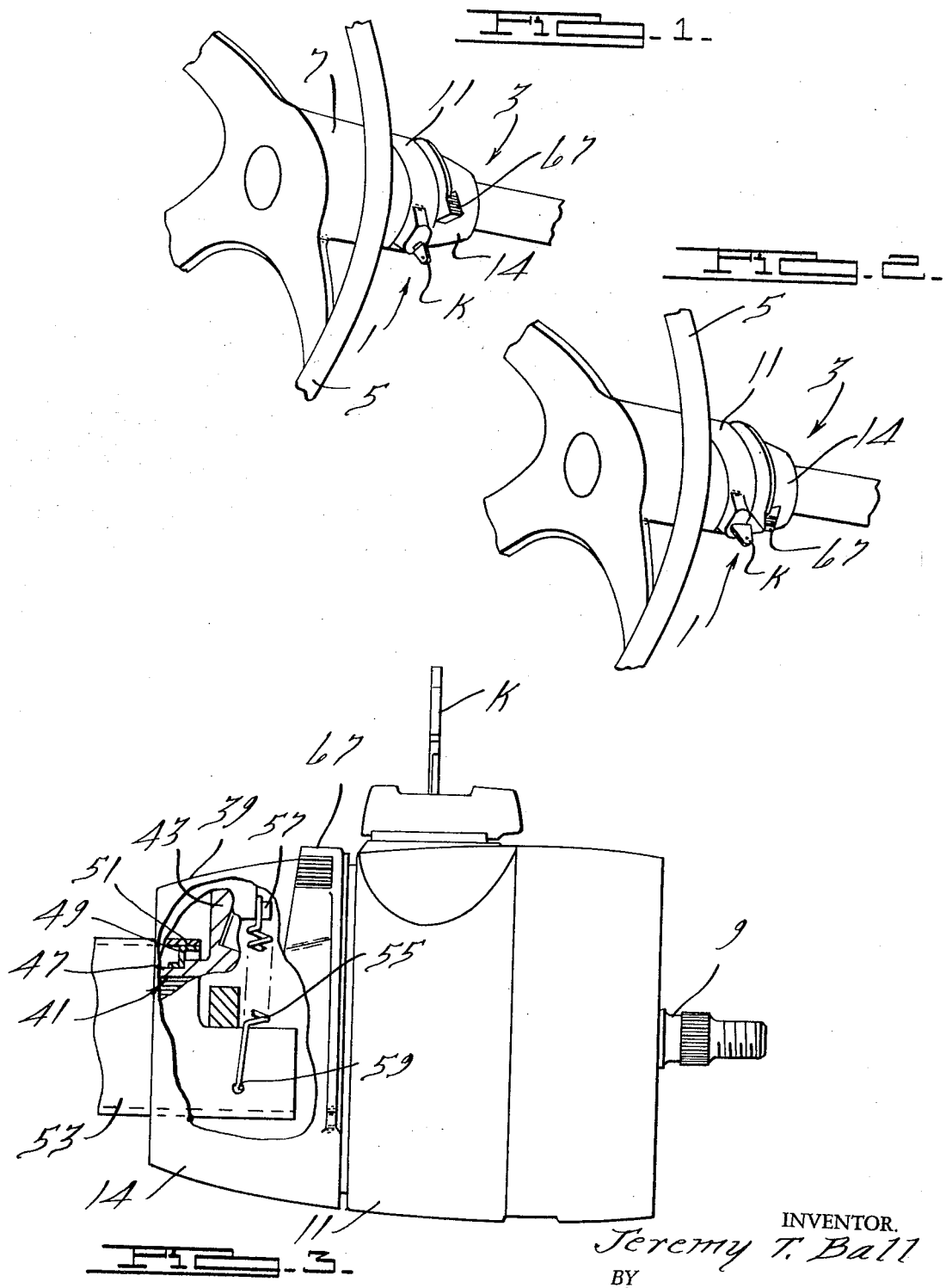

INVENTOR.
Jeremy T. Ball
BY
Talburtt & Baldwin
ATTORNEYS.

3,659,443

STEERING COLUMN LOCK INHIBITOR

BACKGROUND OF THE INVENTION

This invention relates to automotive ignition and steering column locking systems, and more particularly to an improved ignition and steering shaft locking system for vehicles having floor or console mounted shifters.

In vehicles having floor or console mounted shifters it has been the practice to provide a linkage connecting the shifter to a steering shaft and ignition locking device in such a manner that the shaft and ignition could not be locked unless the transmission shifter were placed in a Park position if an automatic transmission were involved or in Reverse position if a manual transmission were involved. This arrangement prevented inadvertent locking of the steering shaft and ignition while the car was in forward motion. However, the moving of the linkage between the shifter and the locking device required additional effort and was somewhat complicated.

BRIEF SUMMARY OF THE INVENTION

Briefly, this invention comprises a rotatable blocking member adapted to be moved from a lock blocking position to a lock enabling position.

One of the primary objects of this invention is to provide a device which will inhibit inadvertent locking of the steering shaft and the ignition.

Another object of this invention is to provide a device of the class described which requires the manual actuation of a separate control member before the shaft and ignition switch can be locked and the key removed.

A further object of this invention is to provide a device such as described adapted to prevent accidental activation of the steering lock while the car is in motion.

Another object of this invention is to provide a device of the type described which requires that a control member be moved to a lock position and manually held in such position while the ignition switch and steering column lock are placed in the lock position.

Still another object of this invention is to provide a device such as described which may be operated with the hand which turns the key to a locking position for the ignition switch and the steering shaft lock.

Another object of this invention is to provide a device of the class described which is economical in construction and effective in operation.

Other objects and advantages of this invention will be made apparent as the description progresses.

BRIEF SUMMARY OF THE DRAWINGS

In the accompanying drawings, in which one of various possible embodiments are shown, FIG. 1 is a fragmentary perspective view of a steering column having a device of this invention mounted thereon, the device being shown in the "Drive" position;

FIG. 3 is a plan view of a device of the invention with certain parts being broken away and shown in section for clarity;

FIG. 6 is a section taken along line 6—6 of FIG. 5.

Like parts are shown by corresponding reference characters throughout the several views of the drawings.

DESCRIPTION OF THE PREFERRED EMBODIMENT

Figure 4:
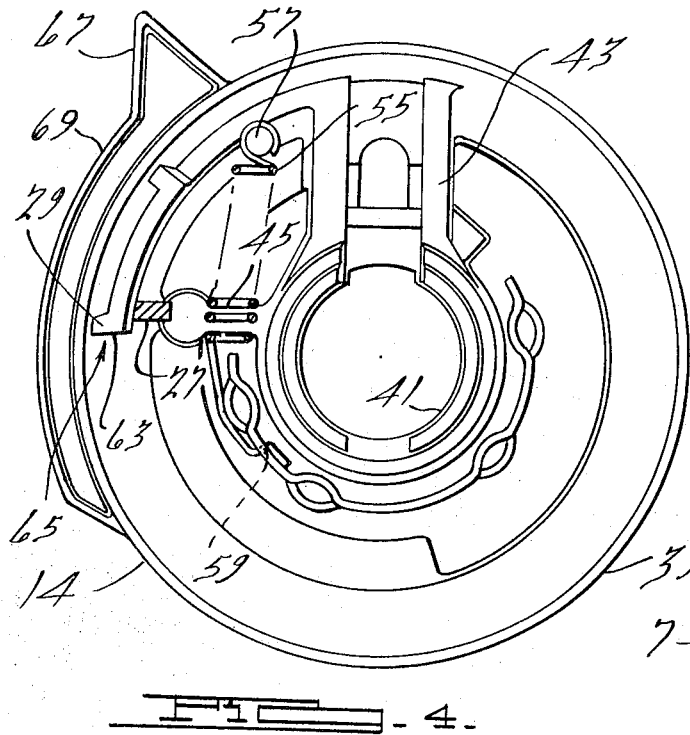
FIG. 4 is an enlarged section taken along line 4—4 of FIG. 3, the device being shown in the "Drive" position.

Referring now to the drawings, a locking device of this invention is shown generally at 1 in FIG. 1. The locking device is mounted on a steering column 3. The column includes the conventional steering wheel 5 having a hub or wheel housing 7 and attached to a steering shaft 9.

The column 3 is provided with a preferably cast housing 11 which contains a locking mechanism 13. Housing 11 serves as a mounting for the upper end portion of the steering shaft 9 which is rigidly secured by conventional means (not shown) to the hub 7 of the vehicle steering wheel 5.

An inhibitor ring 14, described more fully hereinafter, is rotatably mounted on the column below and immediately adjacent housing 11.

Locking mechanism 13 may be of the type generally shown in co-pending U. S. Pat. application Ser. No. 754,422 entitled Steering Column and Transmission Control Lock filed Aug. 21, 1968, now U.S. Pat. No. 3,553,987, dated Jan. 12, 1971 and includes two locking levers 15 and 17 pivotally mounted in housing 11 to pivot about the same axis 19. Lever 15, which may be referred to as a steering wheel lock, includes an upwardly extending leg 21 adapted to be moved into and out of notches 23 in a plate 25 secured to shaft 9. Lever 17 includes a lower leg 27 adapted to be swung into the path of a blocking section 29 located on housing 14. A spring 31 biases the levers to move together as a unit about the axis 19.

Lever 17 has two fingers 33 and 35 which extend therefrom on opposite sides of axis 19. A pin 37 extends laterally from finger 35 adjacent leg 21 of lever 15. Spring 31 tends to hold the pin 37 in contact with leg 21.

Figure 2:
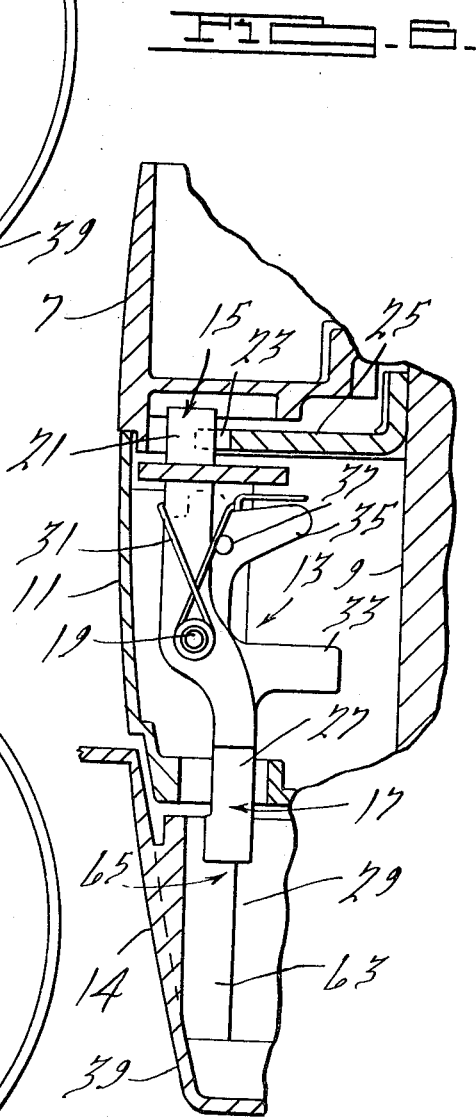
FIG. 2 is a view similar to FIG. 1 showing the device in a "Lock" position.

The lever unit formed by levers 15 and 17 is adapted to be swung clockwise about axis 19 to the FIG. 6 position by a cam plate (not shown) rotated by movement of the key K from the FIG. 1 position to the FIG. 2 position. The cam plate engages finger 33 and tends to push such finger and its associated lever 17 clockwise. Spring 31 causes lever 15 to also tend to move clockwise.

Inhibitor ring 14 is generally bowl-shaped with a tapered cylindrical outer wall 39. An internally located tubular sleeve 41, joined with outer wall 39 by connector arms 43 and 45 surrounds the steering shaft portion 47 at its lower end forming a shoulder 49. A bearing 51 extends between portion 47 and the fixed steering column jacket 53 and rotatably supports the ring.

Figure 5:
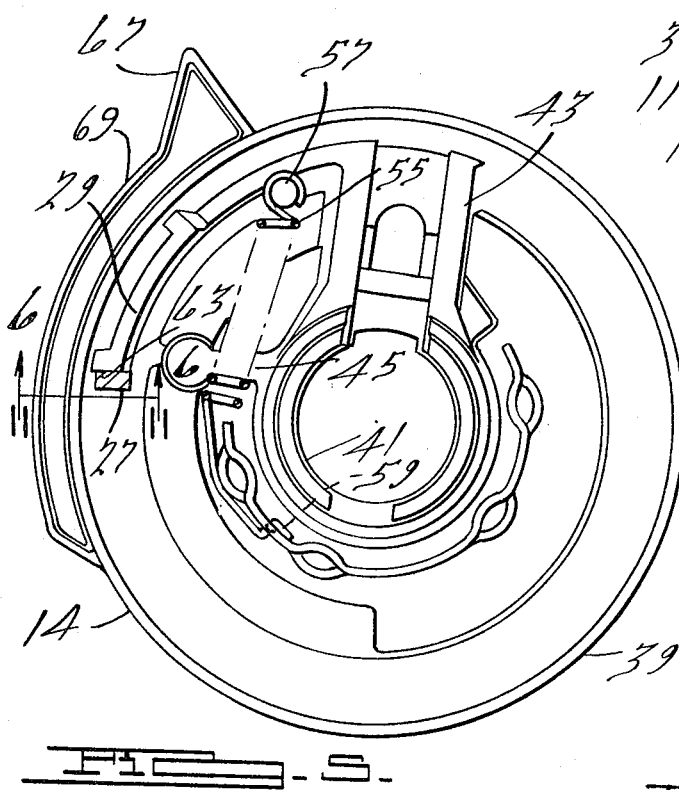
FIG. 5 is a section similar to FIG. 4 showing the device in the "Lock" position.

The ring is biased in a counterclockwise direction as viewed in FIGS. 4 and 5 by a spring 55 extending between an integrally formed pin 57 on the inside of wall 39 and the jacket 53. As shown, one end of spring 55 surrounds pin 57 and the other end extends through a hole 59 in jacket 53. When the inhibitor ring 14 is in the FIG. 4 position, the lower end 27 of lever 17 is blocked against outward movement by the blocking section 29 extending inwardly from annular wall 39. Blocking section 29 has a shoulder 63 at one end thereof which, when moved out of the path of movement of lever 17 as shown in FIG. 5, permits the lower end 27 of the lever to be swung into a recessed or shaft lock enabling area 65.

The inhibitor ring 14 is adapted to be moved from the FIG. 4 position to the FIG. 5 position by manual clockwise movement of a cocking or actuating projection 67 integrally formed on the ring. An elongated portion 69 is provided adjacent projection 67 for bearing instruction on the operation of the inhibiting device of this invention.

Operation of the apparatus is as follows:

During normal driving condition, the spring 55 biases the inhibitor ring to the FIG. 4 position. If the vehicle driver, either inadvertently or on purpose, turns the ignition key K from an "On" position to an "Off" position, the lower end 27 of lever 17 is blocked from movement by section 29. Pin 37 prevents the upper end 21 of lever 15 from moving into any of the notches 23 of shaft locking plate 25. The vehicle operator cannot inadvertently continue turning the key to a lock position. Thus, the likelihood of a driver inadvertently locking the steering shaft while driving is inhibited.

To lock the steering shaft the vehicle operator must move the inhibitor ring 14 to the FIG. 5 position by pressing the projection or lever arm 67 clockwise on the column. This moves blocking section 29 out of the path of movement of the lever 17 and the key may be moved to the lock position. This causes the cam (not shown) to move lever 17 into the recessed area 65. If the upper end 21 of lever 15 is aligned with a notch 23, the spring 31 will cause the lever to move into the notch. However, if the lever is not aligned with a notch the spring 31 will yield when the lower lever 17 is moved into recess 65. As soon as the steering wheel is turned slightly a notch will be brought into alignment with the lever 17 and spring 31 will snap the lever into the notch.

The key K can be removed when it is in the "Lock" position. Once the inhibitor ring 14 is in the lock position and the lever 17 is in recess 65, the ring will stay in that position until the lever is removed from recess 65. This is accomplished turning the key K from the "Lock" position to the "Off" position. The cam (not shown) actuated by the key, engages finger 35 and pushes lever 17 and lever 15 (through pin 37) out of recess 65 and notch 23, respectively. As soon as lever 15 is moved out of recess 65, spring 55 biases ring 14 back to its FIG. 4 position.

It will be seen that the device of this invention decreases the likelihood that a driver will inadvertently place the steering wheel in a locked condition while the vehicle is in forward motion. For example, if in an emergency the driver quickly turns the ignition toward the "Off" position while driving at a freeway speed, for example, the extra manipulative step required to lock the steering shaft should prevent the driver from inadvertently locking such shaft. This device eliminates the need for a linkage connection extending from a floor mounted shifting device to the locking device.

In view of the foregoing it will be seen that the several objects of this invention are achieved.

Although only one embodiment of the invention has been disclosed and described, it is apparent that other embodiments and modifications of the invention are possible.

I claim:

1. In an automotive vehicle steering column structure including a support column connected to the vehicle, a steering control member rotatably mounted within said column, locking apparatus supported by said column and adapted to be moved into a position to lock said control member against rotation, and manually operable inhibitor means normally blocking said locking apparatus against movement into locking position, said manually operable inhibitor means being movable from a position wherein said locking apparatus is blocked to a position in which said locking apparatus may be moved into a locking position, said locking apparatus being rotatable into said locking position, said inhibitor means including a rotatable member adapted to rotate about the axis of said support column.

2. In a steering column structure as set forth in claim 1, said rotatable locking apparatus including a lever, said rotatable member including a blocking portion normally blocking movement of said lever, said rotatable member having a recessed portion adjacent said blocking portion, said lever, when said member is rotated to bring said recessed portion into the path of movement of said lever, being movable into said recess.

3. In a steering column structure as set forth in claim 2, said rotatable member having a projection on the outside thereof adapted to be manually engaged for rotating said member, and a spring extending between said member and said column biasing said member towards a position in which said blocking portion is in the path of movement of said lever.

4. A steering shaft lock inhibitor for a steering shaft locking device pivotally mounted on a steering column of a vehicle and movable between a locking and a non-locking position, said inhibitor comprising a rotatable member mounted on said steering column and movable between a first and second position, said member having means for blocking movement of said locking device into locking position when said member is in said first position, said blocking means being in a position in which said locking device is free to be moved into said locking position when said rotatable member is in said second position, said member being generally bowl-shaped, said means for blocking movement of said locking device into locking position comprising a blocking section extending inwardly of the outer wall of said bowl-shaped section.

5. A steering shaft lock inhibitor as set forth in claim 4 including an internal sleeve surrounding said shaft, and means joining said sleeve to said outer wall.

6. A steering shaft lock inhibitor as set forth in claim 5 wherein said bowl-shaped member has a projection on the outside thereof adapted to be engaged manually for rotating said bowl toward said second position.

7. A steering shaft lock inhibitor for a steering shaft locking device pivotally mounted on a steering column of a vehicle and movable between a locking and a non-locking position, said inhibitor comprising a rotatable member mounted on said steering column and movable between a first and second position, said member having means for blocking movement of said locking device into locking position when said member is in said first position, said blocking means being in a position in which said locking device is free to be moved into said locking position when said rotatable member is in said second position, means biasing said member toward its said first position, and means on said member adapted to be engaged manually for moving said member toward its said second position, said member being generally bowl-shaped, said means for blocking movement of said locking device into locking position comprising a blocking section extending inwardly of the outer wall of said bowl-shaped section.

8. A steering shaft lock and block assembly for an automotive steering shaft comprising key actuated means rotatable from a nonlocking position where said shaft is free to rotate to a locking position wherein said shaft is locked against rotation, and manually operable means adjacent said key actuated means rotatable about the axis of said shaft from a first position in which rotational movement of said key actuated means into locking position is blocked to a second enabling position in which said key actuated means may be rotated into locking position, said manually operable means being generally bowl-shaped and having a projection on the outside thereof adapted to be manually engaged for rotating the same.

* * * * *